United States Patent Office 3,197,328
Patented July 27, 1965

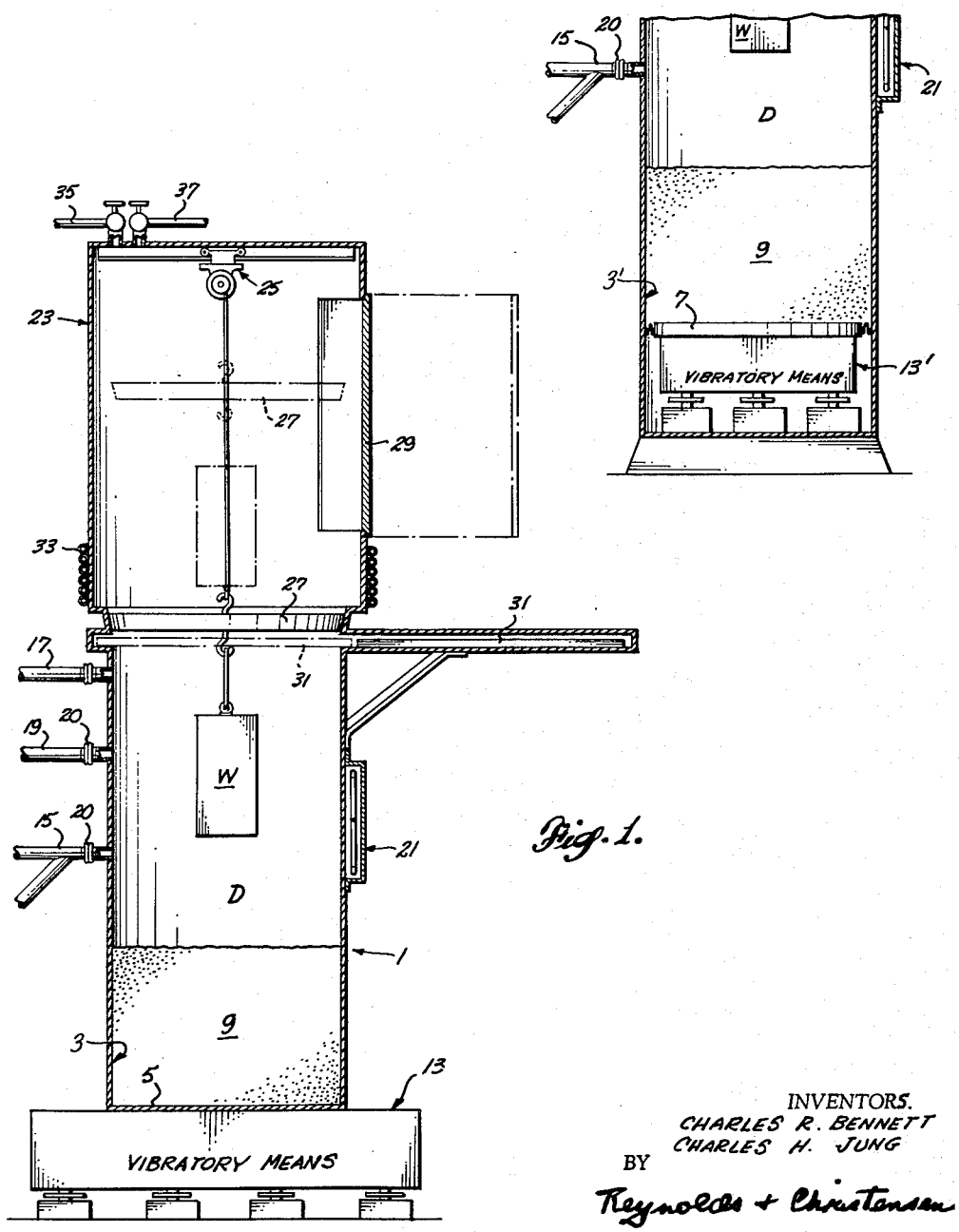

3,197,328
FLUIDIZED BED GENERATED BY
VIBRATORY MEANS
Charles H. Jung and Charles Robert Bennett, Seattle, Wash., assignors to The Boeing Company, Seattle, Wash., a corporation of Delaware
Filed Nov. 15, 1961, Ser. No. 152,470
13 Claims. (Cl. 117—107.2)

This invention relates to apparatus wherein a solid article is subjected to heat treatment by immersing the article in a bed of fluidized particulate material. Such treatment was discussed in our copending application, Serial No. 63,174, filed October 17, 1960, now abandoned, and entitled "Process and Apparatus for Heat Treatment of Metals." The present application is a continuation in part of the aforesaid application which is now abandoned.

A fluidized bed, as such, results from imparting relative motion to a bed of solid particles to the extent that the bed behaves like a fluid or liquid. Conventionally, this condition is generated by passing an upwardly directed gas stream into the bed container at a rate and velocity adapted to buoy the bed particles into motion without sweeping them out of the container. It has also been proposed to agitate the particles with mechanical means so embedded in the bed as to enable beating it into the fluidized condition.

An object of the present invention is to devise a novel fluidization system which enables complete control to be maintained over the internal atmosphere of the bed container and, if desired, pressurized or depressurized conditions to be acquired in the container.

Another object of the invention resides in reducing the expenses entailed in operating facilities of this type, and in particular reducing the quantities of materials, both inert and reactive, needed to conduct operations such as those described in our aforementioned copending application and in another copending application, Serial No. 147,004, filed October 23, 1961 and entitled "Metal Diffusion Coating Utilizing a Fluidized Bed," of which applicant Jung herein is a co-applicant.

A further object of the invention is to provide a facility of this type wherein the fluidized phase is susceptible to greater variation in density, thus allowing for greater variation in bed particle size.

Still another object of the invention is to provide a bed facility wherein greater control can be maintained over heat application to the bed and heat loss from the facility.

Other objects of the invention include providing a bed facility which is more versatile and reliable than those previously employed; and providing a reactor facility for reactive or mass transfer treatment operations, such as the metal diffusion coating operations described in our aforementioned application, Serial No. 147,004, in which the operation can be carried out in a static reactive atmosphere, and the coating metal or other reactant can be reused in the reactor facility.

These and other objects are reached, according to the invention, by a method and apparatus of our conception wherein the article is enclosed in a static atmosphere occupied in part by a bed of fluidized particulate material, and immersed in the bed while the atmosphere is maintained in the static condition. That the atmosphere can be maintained in the static condition while the article is so immersed, is due to the way in which we generate the fluidized condition in the bed. In general, we cause the bed particles to undergo what can be called controlled impact or "shock" to set them in motion, such as by vibrating the bed container at a frequency and amplitude which mechanically agitates them into the fluidized condition. Due to the continued static condition of the atmosphere, maximum control can be maintained over the variables of time, temperature, and pressure, and in addition, over the character of the atmosphere itself. Its pressure may be increased or decreased, thereby enabling the system to take advantage of the critical dissociation pressures of various elements and their compounds. This is particularly significant in removing oxides from various kinds of ores. Moreover, parts can be brought to reaction temperature rapidly and removed from the system rapidly. Any gas or vapor introduced to the treatment zone may be limited in amount to that required for the chemical reaction per se and can be reused in later stages or operations. Either a dense phase—that is, one in which the bed is expanded only within conventional limits to generate the fluidized condition—or a dilute phase—that is, one in which the bed is expanded into a highly turbulent "cloud" of moving particles—is possible within the closed system of the invention. As a result, a variety of bed material sizes may be used.

One of the more significant aspects of the new system is the fact that it can be operated under vacuum. The bed container can be sealed shut, placed under vacuum, and operated as a vacuum furnace with reliance placed on the fluidized particles to function as the vector of heat communication. The particles will act as a more efficacious medium, than in a conventional gas-borne system due to the absence of a gaseous phase acting to insulate one particle from another. It is contemplated, moreover, that the facility can be used not only to raise the temperature of a work piece, but also to effect heat loss from the workpiece. In particular, the facility may be used as a quenching bath for the work piece, as, for example, where a pair of beds are interconnected and operated under vacuum, one as a vacuum furnace and the other as the quenching bath. Because of the absence of any gaseous phase in the bed chamber, the bed particles will not be swept from the chamber by the evacuating means, provided the amplitude and frequency of the vibratory means is not such as to "throw" the particles into the vacuum port.

The invention will be better understood with reference to the accompanying drawings which illustrate certain preferred forms of the invention, without limiting it thereto, and wherein:

FIGURE 1 illustrates a bed facility in which the bottom of the container provides a receptacle for the bed and is mounted for vibration on underlying vibratory means; and FIGURE 2 illustrates the lower portion of a bed facility wherein a bed support plate is flexibly mounted within the container in conjunction with vibratory means.

Each facility includes a container 1 having interior surfaces which define a receptacle 3 or 3' for a bed of particulate material 9. In FIGURE 1 the receptacle 3 is formed by the bottom portion 5 of the container 1; whereas in FIGURE 2 the receptacle 3' is formed by the walls of the container 1 and a transverse plate 7 flexibly connected between the walls. The container rests on vibratory means 13 in FIGURE 1 so that the bed 9 can be fluidized by vibrating the container as a whole. In FIGURE 2, the vibratory means 13' is mounted in the container with the plate 7 resting thereon so that vibration need only be imparted to the plate alone. Other arrangements will appear to one skilled in the art. The vibratory means may be a known type of electromagnetic vibrator or any other such means capable of generating the necessary amplitude and frequency.

The particulate matter can be, and usually is of refractory material, such as silicon carbide, alumina, crushed Olivine, zirconium oxide, Ione grog, white silica sand, all of which have a high thermal conductivity. Under stable fluidized conditions, the mass of such matter in its so-called dense phase will stir gently and behave much like a liquid medium. In its so-called dilute phase, the mass will become more turbulent and will tend to form a swirling cloud rising into the bed chamber D. In either instance the surface to surface contact of the randomly moving particles will confer a high degree of temperature uniformity on the reaction zone and will provide ideal circumstances for low and high temperature heating or rapid quenching. Moreover, by introducing a reactive gas and/or vapor into the chamber through duct 15, either alone or in admixture with an inert medium, the chamber can be charged with a reactive atmosphere adapted for a surface treatment or mass transfer operation. In the alternative, the chamber can be evacuated through vacuum duct 17, operated in conjunction with a purge gas duct 19. The ducts 17 and 19 can or may be combined. All ducts in the case of at least the embodiment of FIGURE 1 are equipped with a flexible joint 20 to allow for vibratory motion of the container.

Heat may be applied either externally or internally. Heat means 21, such as an electric resistance grid, are illustrated schematically in external relation to the container 1 of the illustrated embodiments.

The workpiece W is introduced to the heated chamber D by way of a loading chamber 23 equipped with a gantry 25. Once the workpiece is suitably suspended on the gantry in the chamber D, the chamber is closed off and sealed by a gate seal 27, fluidization is started, and any reactants are applied when the piece has reached the desired temperature. The loading chamber 23 is equipped further with a door seal 29, a sliding seal 31, cooling coils 33, and purge lines 35 and 37.

In a test designed to measure temperature uniformity in the bed chamber, an 18 inch by 26 inch high bed facility was bolted to an electromagnetic vibrating table. The chamber was filled to a depth of 20 inches with 80–150 mesh Olivine sand and subjected to 15–20 vibrations per second at 3–5 G's acceleration. Heat was applied by 8 T–3 lamps (each with a quartz tube and tungsten filament operable at 3300–3500° F.) mounted independent of the vibrating table and placed 1–1½ inches from the outer wall of the bed facility. Temperature uniformity in the chamber was found to be ±2° F. at 300° F.

In a second test, 4 inches of −200 mesh Olivine sand was subjected to 30 vibrations per second at 2.5 G's acceleration. Temperature uniformity at 300° F. was also ±2° F.

While the invention has been described with reference to certain preferred forms thereof, it is to be understood that these are susceptible to many modifications and additions without departing from the scope and spirit of the invention as defined in the following claims.

We claim as our invention:

1. Apparatus for heat treating a solid article under vacuum comprising a closed, air-tight container having a bed of particulate material therein, means for evacuating the container to create a vacuum condition in the bed, means for fluidizing the bed, and means for immersing the article in the fluidized bed while maintaining the vacuum condition therein.

2. Apparatus according to claim 1 wherein the bed fluidizing means is vibratory in character.

3. Apparatus according to claim 1 further comprising means for applying heat to the fluidized bed while the article is immersed therein.

4. Apparatus according to claim 2 wherein the article immersing means includes a gantry device for suspending the article in the container while the same is closed and evacuated, and means connected with the gantry device for immersing the article in the fluidized bed while the container remains closed and evacuated.

5. Apparatus for treating a solid article with a static charge of a gas and/or vapor that is reactive therewith, comprising a closed, air-tight container having a bed of particulate material therein, means for charging the container with the gas and/or vapor to fill the bed with a static charge of the same, means for fluidizing the bed, and means for immersing the article in the fluidized bed while maintaining the static condition of the charge therein.

6. Apparatus according to claim 5 wherein the bed fluidizing means is vibratory in character.

7. Apparatus according to claim 5 further comprising means for applying heat to the fluidized bed while the article is immersed therein.

8. Apparatus according to claim 6 wherein the article immersing means includes a gantry device for suspending the article in the container while the same is closed and charged with the gas and/or vapor, and means connected with the gantry device for immersing the article in the fluidized bed while the container remains closed and charged with the gas and/or vapor.

9. A method of cooling a heated solid article under vacuum comprising enclosing the article in an air-tight container having a bed of particulate material therein, evacuating the container to create a vacuum condition in the bed, fluidizing the bed at a temperature below that of the article, and immersing the article in the fluidized bed while maintaining the vacuum condition therein.

10. A method of treating a solid article with a static charge of a gas and/or vapor that is reactive therewith, comprising enclosing the article in an air-tight container having a bed of particulate material therein, charging the container with the gas and/or vapor to fill the bed with a static charge of the same, and fluidizing the bed and immersing the article therein while maintaining the static condition of the charge in the bed.

11. A method according to claim 10 further comprising applying heat to the fluidized bed while the article is immersed therein.

12. A method according to claim 10 wherein the charge is pressurized.

13. A method of heating a solid article under vacuum comprising enclosing the article in an air-tight container having a bed of particulate material therein, evacuating the container to create a vacuum condition in the bed, fluidizing the bed, immersing the article in the fluidized bed, and applying heat to the bed while maintaining the vacuum condition therein.

References Cited by the Examiner

UNITED STATES PATENTS

| | | | |
|---|---|---|---|
| 2,498,405 | 2/50 | Fader | 23—288.3 X |
| 2,637,625 | 5/53 | Garbo | 23—2 |
| 2,667,706 | 2/54 | Morse et al. | 34—4 |
| 2,817,127 | 12/57 | Beech | 22—56 X |
| 2,856,273 | 10/58 | Beber et al. | 23—1 X |
| 3,053,704 | 9/62 | Munday | 148—20.3 |

FOREIGN PATENTS

| | | |
|---|---|---|
| 732,101 | 6/55 | Great Britain. |
| 564,846 | 7/57 | Italy. |

JOHN F. CAMPBELL, *Primary Examiner.*

MARCUS U. LYONS, JAMES H. TAYMAN, JR., MORRIS O. WOLK, *Examiners.*